Jan. 16, 1940.  L. F. CARTER  2,187,678
WAVE MOTOR
Filed Nov. 1, 1938  2 Sheets-Sheet 1
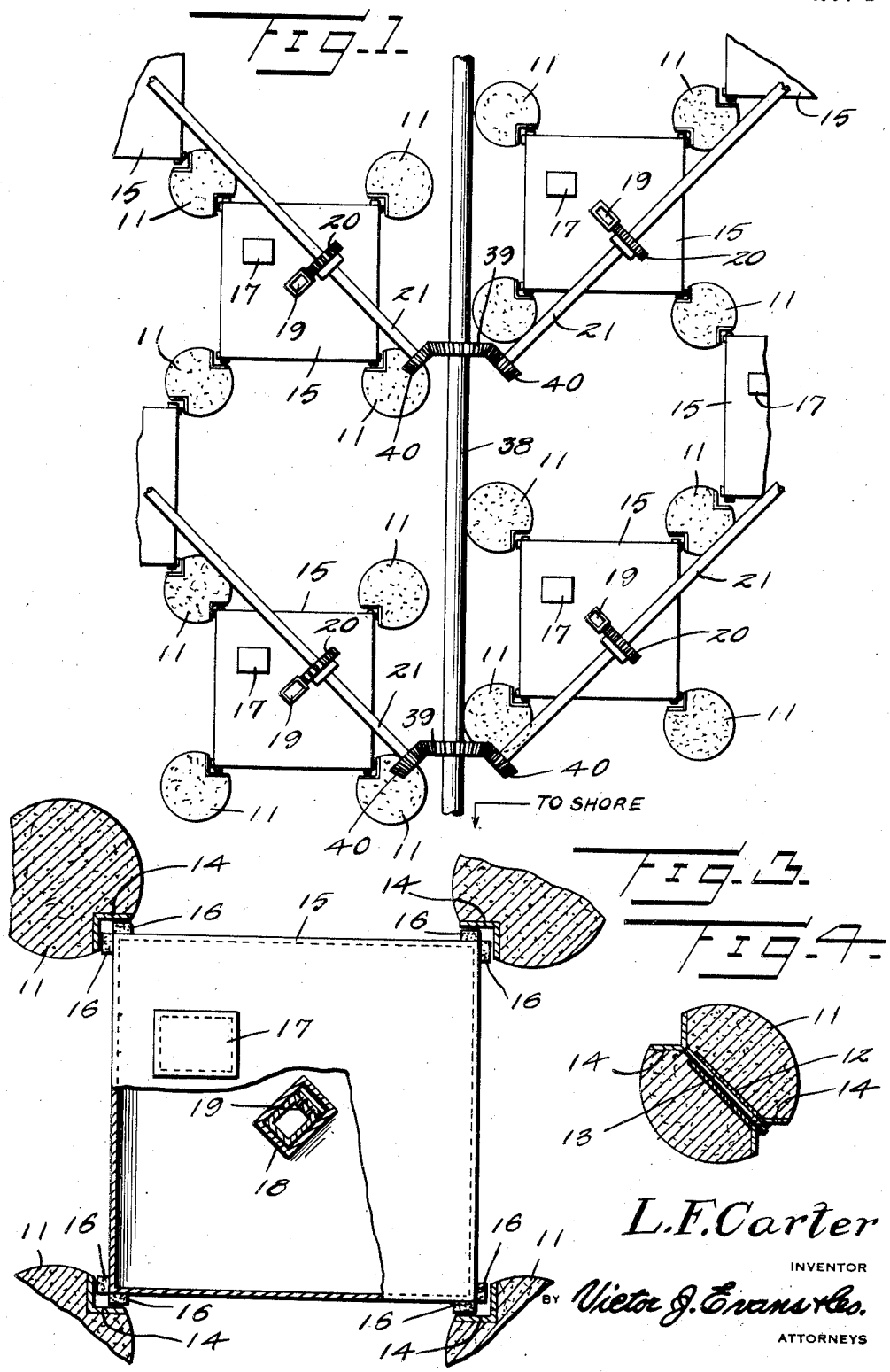
L. F. Carter
INVENTOR
BY Victor J. Evans & Co.
ATTORNEYS Jan. 16, 1940.        L. F. CARTER        2,187,678
WAVE MOTOR
Filed Nov. 1, 1938        2 Sheets-Sheet 2
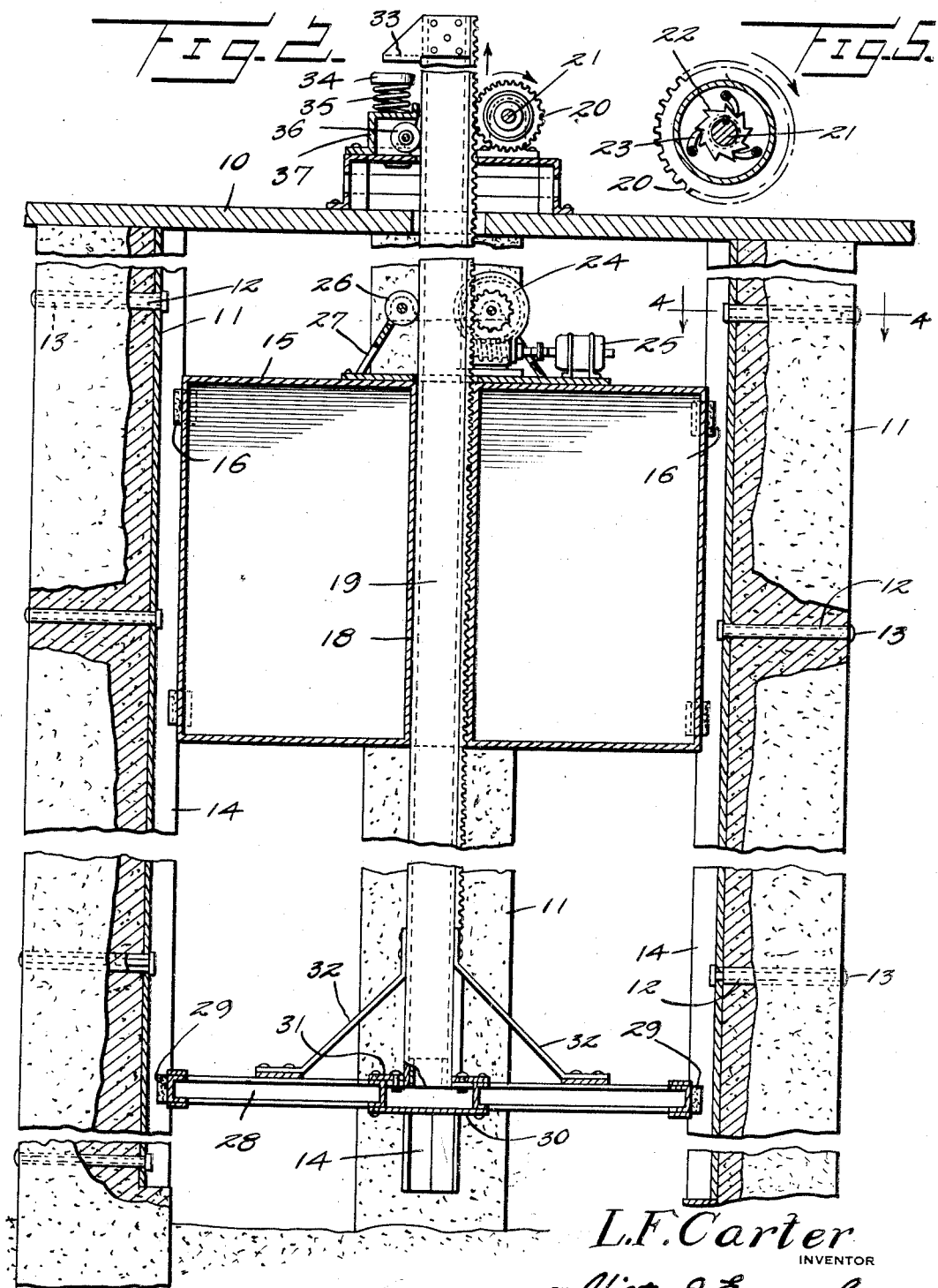
L.F. Carter
INVENTOR
BY Victor J. Evans & Co.
ATTORNEYS Patented Jan. 16, 1940

2,187,678

UNITED STATES PATENT OFFICE 2,187,678

WAVE MOTOR

Leonard F. Carter, Pontiac, Mich.

Application November 1, 1938, Serial No. 238,282

2 Claims. (Cl. 253—10)

This invention relates to wave motors and has for an object to provide improved means for guiding the rise and fall of a float so that frictional resistance is reduced to a minimum.

A further object is to provide means for adjustably securing the float to a rack bar carried by the float, so that the float may be located on the rack bar at various heights to compensate for variations in wave impulses such as increased height of waves due to storms and other weather conditions.

A further object is to provide a wave motor in which the power is taken from the rack bar by a ratchet pulley and conveyed by a shaft to the shore or other location where the power is to be consumed.

A further object is to provide a wave motor in which the rack bar is provided at the upper end with a bumper head to diminish the output of the motor and maintain the float at rest for repairs.

A further object is to provide a wave motor which will be formed of a few strong simple and durable parts, which will be inexpensive to manufacture and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 1 is a plan view of a wave motor constructed in accordance with the invention and showing a plurality of float guide pilings, respective power take off shafts for the floats, and a main power transference shaft geared to the take off shafts.

Figure 2 is a longitudinal sectional view showing one of the floats, the guide pilings, pier supported by the pilings and speed reduction gear for adjusting the position of the float on its rack bar by a remote controlled motor carried by the float.

Figure 3 is a plan view of one of the floats and showing the guide pilings thereof in cross section to better illustrate the angle iron guide flanges carried by the pilings and the wear shoes disposed upon the longitudinal end edge portions of the float walls, a portion of the float being broken away to expose the float rack.

Figure 4 is a cross sectional view taken on the line 4—4 of Figure 2 and showing how the angle iron guide plates are bolted to the pilings.

Figure 5 is an enlarged detail cross sectional view of the ratchet gear on one of the power take off shafts.

Referring now to the drawings in which like characters of reference designate similar parts in the various views, 10 designates a pier or other type of platform, which is supported upon piles 11 fabricated of concrete and each having imbedded therein metal tubes 12 adapted to receive bolts 13 which secure angle iron guide plates 14 to the piles, as best shown in Figure 3.

Each set of four piles form vertical guides for a respective float 15 which is substantially rectangular in longitudinal and in cross section. Wear shoes 16 are disposed on the longitudinal edge portions of the float walls and loosely fit within a respective angle iron guide plate 14 so that frictional resistance will be reduced to a minimum during rise and fall of the float due to wave impulses. The roof of the float is provided with a trap door 17 though which access may be gained to the interior of the float when necessary.

The float is provided with a vertically disposed and centrally located sleeve 18 of substantially rectangular cross section in which is housed a rack bar 19. The purpose of the rack bar is to rotate a gear 20 which is secured to a power take off shaft 21 through the medium of a ratchet wheel 22 and dogs 23, the latter confining the gear 20 to rotation by the rack bar only on the upstroke of the rack bar, the gear idling during the gravitating stroke of the float.

The float is adjustably secured at any desired height on the rack bar through the instrumentality of a conventional reduction gear mechanism 24 which is driven by a motor 25 controlled from a point remote with respect to the float. This adjustment of the float on the rack bar compensates for variations in wave impulses such as increased height of waves due to storms and other conditions.

A pulley 26 is supported upon a bracket arm 27 and engages the side of the rack bar directly opposite the reduction gear mechanism to hold the rack bar in mesh with the reduction gear mechanism at all times in such manner as to lock the rack bar in any desired adjusted position.

For guiding the reciprocatory movement of the rack bar 19 arms 28 are terminally equipped with wear shoes 29 which engage loosely within the angle iron guides 14, these arms radiating from a spider 30 which is bolted to a flange 31 which extends from the bottom of the rack bar. Inclined braces 32 are connected to the rack bar and to the arms and reinforce the arms to resist distortion.

As best shown in Figure 2, the rack bar is provided at the upper end with a laterally extending head 33 which is adapted to engage a bumper 34 supported in the path of movement of the head through the medium of a cushion spring 35. The head is adapted to impinge against the bumper without shock when it is desired to diminish the power output and also when it is desired to halt operation of the motor for repairs.

A pulley 36 is supported within a casing 37 which supports the spring 35, and bears upon the opposite side of the rack bar from the rack to hold the rack permanently in mesh with the ratchet controlled gear 20.

As best shown in Figure 1, the power take off shafts 21 of a group of floats 15, are arranged to extend obliquely across their respective floats so as to be conveniently geared to a power transference shaft 38 through the instrumentality of meshing bevel gears 39 and 40. The power transference shaft is suitably supported upon the pier or platform 10 in any preferred manner and extends to the shore where the power is to be consumed.

In operation, as the waves consecutively elevate the floats 15 the respective rack bars 19 will be elevated, and through the instrumentality of the gears 20, transmit motion in one direction only to the power take off shafts 21. As the waves pass on, the floats will gravitate. Since the wave motors are arranged along the entire length of the pier when a wave recedes from certain of the floats it will arrive at succeeding ones of the floats and elevate them and thus continuous rotation of the power transference shaft 38 will be effected.

In practice the floats are disposed well out beyond the breakers so as to be operated by the swells.

From the above description it is thought that the construction and operation of the invention will be fully understood without further explanation.

What is claimed is:

1. A wave motor comprising the combination of a vertically disposed rack bar, a float adjustable longitudinally on the rack bar, means for adjusting the float to compensate for variations in water level, guide piles slidably supporting the float, a plurality of arms extending from the bottom of the rack bar and slidably engaging the piles for guiding reciprocatory movement of the rack bar, a laterally extending head on the top of the rack bar, a platform supported by the piles, and a resilient bumper on the platform against which said head may impinge when the float descends to minimize shock on the parts.

2. The structure as recited in claim 1 in which the means for adjusting the float to compensate for variations in water level comprising an electric motor on the float, and a reduction gear connected to the motor and to the rack.

LEONARD F. CARTER.